United States Patent
Domsch et al.

(10) Patent No.: US 8,874,786 B2
(45) Date of Patent: Oct. 28, 2014

(54) NETWORK TRAFFIC CONTROL BY ASSOCIATION OF NETWORK PACKETS AND PROCESSES

(75) Inventors: Matthew L. Domsch, Austin, TX (US); Hendrich M. Hernandez, Austin, TX (US); Robert L. Winter, Burnet, TX (US); Shawn J. Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 13/593,106

(22) Filed: Aug. 23, 2012

(65) Prior Publication Data

US 2013/0104127 A1    Apr. 25, 2013

Related U.S. Application Data

(63) Continuation-in-part of application No. 13/281,192, filed on Oct. 25, 2011.

(51) Int. Cl.
*G06F 15/173* (2006.01)
*G06F 9/455* (2006.01)
*G06F 9/50* (2006.01)

(52) U.S. Cl.
CPC .......... *G06F 9/45558* (2013.01); *G06F 9/5077* (2013.01); *G06F 2009/45595* (2013.01)
USPC ...................................................... 709/238

(58) Field of Classification Search
CPC ...................................................... H04L 45/00
USPC ...................................................... 709/238
See application file for complete search history.

(56) References Cited

U.S. PATENT DOCUMENTS

| | | | |
|---|---|---|---|
| 7,584,286 B2 | 9/2009 | Goglin et al. | |
| 7,757,033 B1 * | 7/2010 | Mehrotra et al. | 710/316 |
| 7,953,915 B2 * | 5/2011 | Ge et al. | 710/266 |
| 8,072,966 B2 * | 12/2011 | MeLampy et al. | 370/352 |
| 8,087,034 B2 * | 12/2011 | Frank et al. | 719/318 |
| 8,543,729 B2 * | 9/2013 | Pope et al. | 709/238 |
| 2006/0182031 A1 | 8/2006 | Tran | |
| 2009/0006521 A1 * | 1/2009 | Veal et al. | 709/201 |

(Continued)

OTHER PUBLICATIONS

Huggahalli, et al. "Direct Cache Access for High Bandwidth Network I/O," IEEE 2005; 10 pgs.

(Continued)

*Primary Examiner* — Lance L Barry
(74) *Attorney, Agent, or Firm* — Terrile, Cannatti, Chambers & Holland, LLP; Robert W. Holland (57) ABSTRACT

An information handling system (IHS) includes a plurality of processors that include a cache memory, and a receive side scaling (RSS) indirection table with a plurality of pointers each pointing to a processor. A network data packet received by the IHS determines a pointer to a first processor. In response, information associated with the network data packet is transferred to the cache memory of the first processor, The IHS also includes a process scheduler that moves a process associated with the network data packet from a second processor to the first processor, and RSS module that directs the process scheduler to move the process and associates the first pointer with the processor in response to directing the process scheduler. In one embodiment, the processes are virtual machines so that network packets associated with a virtual machine are processed by sending an interrupt to a processor supporting executing the virtual machine.

16 Claims, 7 Drawing Sheets

(56) References Cited

U.S. PATENT DOCUMENTS

| | | | |
|---|---|---|---|
| 2010/0061377 A1 | 3/2010 | Goglin et al. | |
| 2010/0064286 A1 | 3/2010 | Pinter et al. | |
| 2010/0083259 A1 | 4/2010 | Veal et al. | |
| 2010/0333101 A1* | 12/2010 | Pope et al. | 718/103 |
| 2011/0023042 A1* | 1/2011 | Pope et al. | 718/102 |
| 2011/0202983 A1* | 8/2011 | Pope et al. | 726/7 |
| 2012/0033673 A1* | 2/2012 | Goel | 370/400 |

OTHER PUBLICATIONS

"Scalable Networking: Eliminating the Receive Processing Bottleneck—Introducing RSS," Microsoft, WinHEC 2004 Version—Apr. 14, 2004, 17 pgs.

"Introduction to Receive-Side Scaling" (Windows Driver Kit), MSDN, 4 pgs.

* cited by examiner

NETWORK TRAFFIC CONTROL BY ASSOCIATION OF NETWORK PACKETS AND PROCESSES

CROSS-REFERENCE TO RELATED APPLICATION

This application is a continuation-in-part of co-pending U.S. patent application Ser. No. 13/281,192, filed Oct. 18, 2011, entitled "Method of Handling Network Traffic Through Optimization of Receive Side Scaling" by inventors Matthew L Domsch, Robert Lee Winter, Rich Hernandez, and Shawn Dube, describes exemplary methods and systems and is incorporated by reference in its entirety.

FIELD OF THE DISCLOSURE

The present disclosure generally relates to information handling systems, and more particularly relates to handling network traffic in an information handling system through optimization of receive side scaling.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. Other teachings can be used in this application, and the teachings can be used in other applications and with different types of architectures, such as a client-server architecture, a distributed computing architecture, or a middleware server architecture and associated resources.

Figure 1:
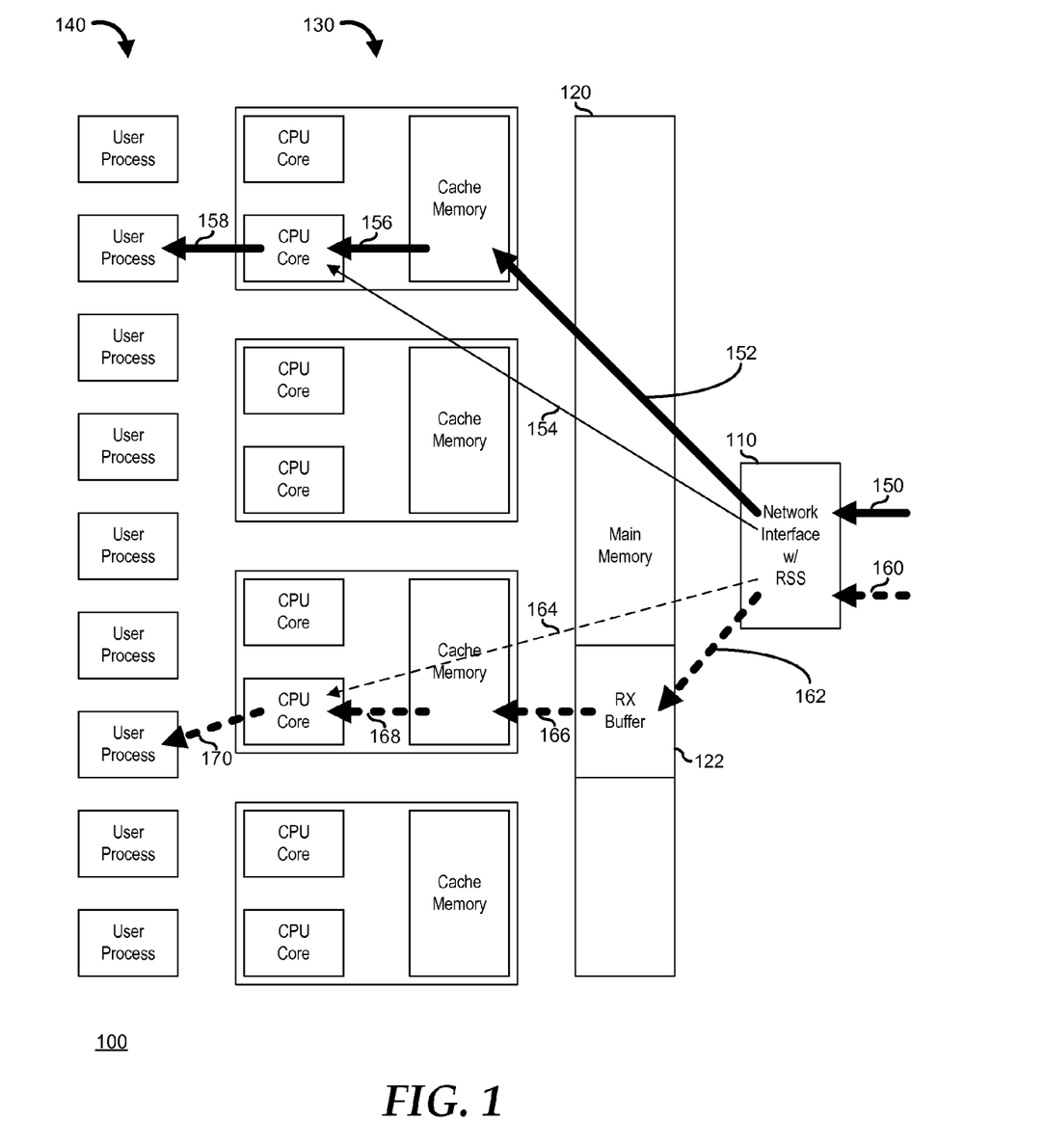
FIG. 1 is a block diagram of an information handling system with a network interface that implements receive side scaling according to an embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, information handling system 100 includes a network interface 110, a main memory 120, a group of processors 130 each including one or more central processing unit (CPU) cores and a cache memory, and a group of user processes 140. Network interface 110 represents an interface device between information handling system 100 and an external network (not illustrated), and operates to provide receive side scaling for network traffic received by the information handling system. In a particular embodiment, when network traffic 150 is received by network interface 110, the information 152 included in the network traffic is sent to the cache of the processor 130 that is associated with the network flow, and an interrupt 154 is provided to the CPU core associated with the network traffic. When the CPU core receives interrupt 154, the CPU core retrieves the data 156 and provides the data 158 to the user process 140 associated with the network traffic. In another embodiment, when network traffic 160 is received by network interface 110, the information 162 included in the network traffic is sent to a receive buffer 122 of main memory 120, and an interrupt 164 is provided to the CPU core associated with the network traffic. The CPU core retrieves the information 166 to the cache memory of the processor 130 that is associated with the network flow, retrieves the data 168 from the cache memory, and provides the data 170 to the user process 140 associated with the network traffic.

Network interface 110 can be implemented as a network interface card (NIC) of information handling system 100 or as a network capability that resides on a system board of the information handling system. In implementing receive side scaling (RSS), network interface 110 can provide interrupts 154 and 164 as hardware interrupts, as software interrupts, as virtual interrupts in a virtual machine environment, or as a combination thereof. In a particular embodiment, the RSS capability of network interface 110 is limited as to the number of available RSS channels, and by extension, to the number of processors 130 that can be used to handle network traffic. In particular, the number of RSS channels can be less than the number of processors 130 in information handling system 100. In one embodiment, the processors 130 that are associated with the RSS channels are predetermined by a firmware component of network interface 110 when information handling system 100 is powered on. In another embodiment network interface 110 operates to determine if a particular processor 130 is idle or lightly loaded, and modifies the associations between the RSS channels and the processors to provide the task of handling network traffic to idle or lightly loaded processors.

In yet another embodiment, network interface 110 operates in conjunction with a CPU scheduler (not illustrated) to optimize the loading of network traffic tasks by ensuring that the network processing is performed by a processor 130 that is also handling the user process 140 associated with the network traffic. As such, network interface 110 can provide a prompt to the CPU scheduler to move a particular task associated with a network traffic flow to a processor 130 that is associated with an RSS channel, or the CPU scheduler can modify the associations between the RSS channels and the processors to map the network data directly to the user process 140 associated with the network traffic flow. In a particular embodiment, network interface 110 operates with the CPU scheduler to optimize the loading of network traffic tasks in response to changes in the flow rate of network traffic into the network interface.

In another embodiment, the selection of a particular RSS channel is based upon the application of a hashing function to incoming data packets. Here, network interface 110 can choose from among several hashing methods, or can select different fields, or tuples, of the data packets on which the hashing methods operate, in order to more effectively optimize the processing network traffic flows. In another embodiment, the CPU scheduler modifies the associations between the RSS channels and processors 130 based upon prompts received from network traffic intensive applications, or can track outgoing network traffic from the processors and modifies the associations based upon the outgoing network traffic. In another embodiment, user process 140 can provide prompts to the CPU scheduler or to network interface 110 to modify the associations.

Figure 2:
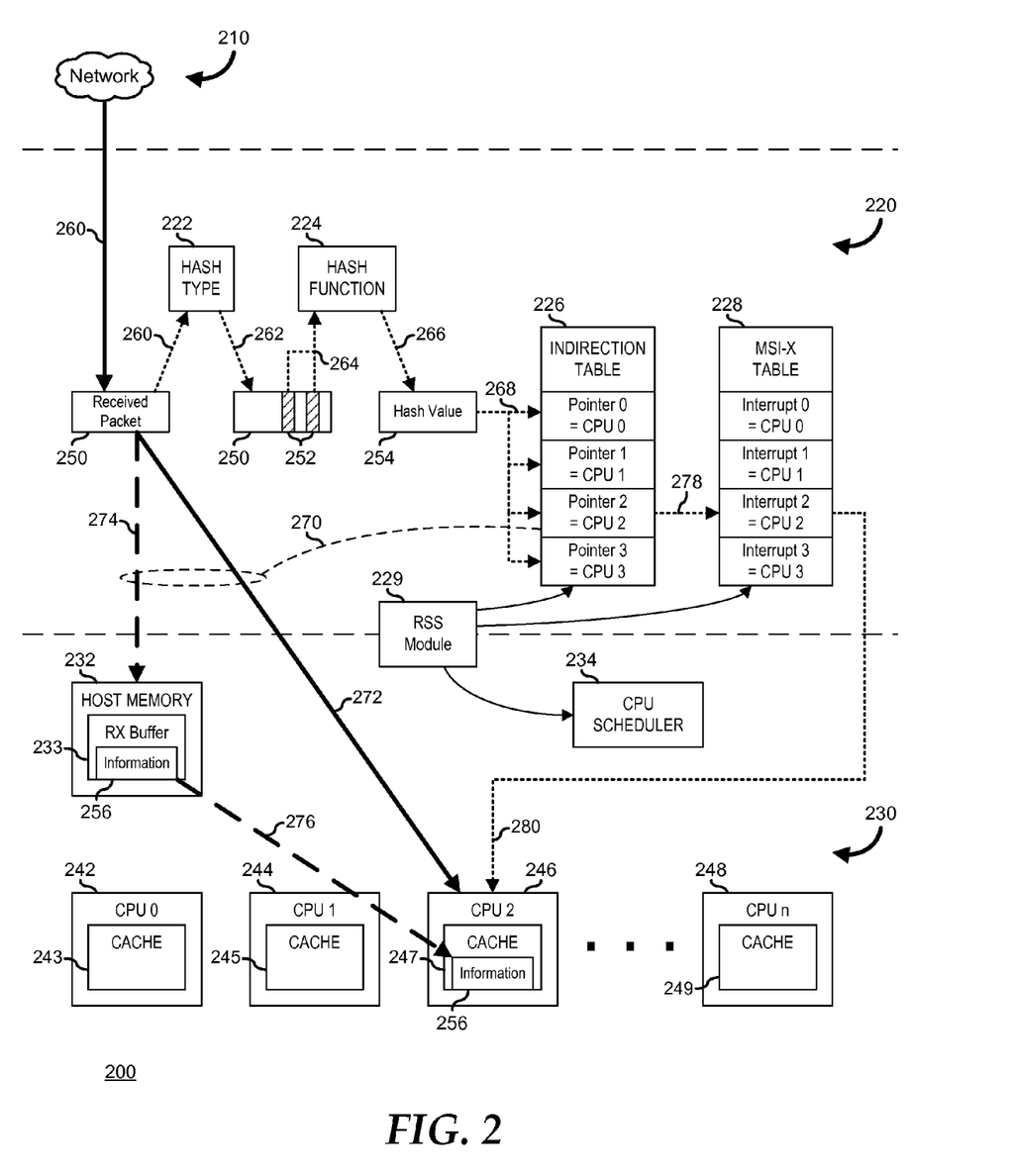
FIG. 2 is a block diagram of an information handling system similar to the information handling system of FIG. 1 according to an embodiment of the present disclosure.

FIG. 2 illustrates an information handling system 200 that is similar to information handling system 100, including a network interface 220 and a host system 230. Network interface 220 includes a hash type module 222, a hash function module 224, an RSS indirection table 226, a message signaled interrupt (MSI-X) table 228, and an RSS module 229. Host system 230 includes a host memory 232, a CPU scheduler 234, and CPUs O-n (labeled 242, 244, 246, and 248, respectively. Host memory 232 includes a receive buffer 233, and each CPU 242-248 includes a respective cache memory 243, 245, 247, and 249. Network interface 220 is connected to a network 210 to receive network data traffic. As illustrated, MSI-X table 228 is shown as a part of network interface 220, but this need not always be so. For example, MSI-X table 228 can be implemented as part of a chipset component of host system 230, or elsewhere in information handling system 200, as needed or desired.

In operation, information handling system 200 performs functions similar to information handling system 100, as described above. In particular, when a data packet 250 is received 260, the data packet is analyzed by hash type module 222 to determine 262 one or more fields 252, or tuples of the data packet that are to be analyzed by hash function module 224, and the fields are forwarded 264 to the hash function module for determination 266 of a hash value 254 of the received data packet. Hash value 254 is provided 268 as a pointer into indirection table 226. For example, as illustrated, indirection table 226 includes four RSS channels such that when hash value 254 is in a first range of values, a pointer 0 is selected that points to CPU 0 (242), when hash value 254 is in a second range of values, a pointer 1 is selected that points to CPU 1 (244), when hash value 254 is in a third range of values, a pointer 2 is selected that points to CPU 2 (246), and when hash value 254 is in a fourth range of values, a pointer 3 is selected that points to CPU 3 (248). Indirection table 226 can include more or fewer RSS channels, as needed or desired. When a particular pointer is selected from indirection table 226, such as pointer 2 in the illustrated example, the information 256 that is extracted from data packet 250 is directed 270 by the indirection table pointer to be transferred 272 to the cache 247 of the selected CPU 246.

When the pointer is selected from indirection table 226, the pointer also serves to select 278 an entry from MSI-X table 228. In a particular embodiment, there is a one-to-one correspondence between the number of RSS channels implemented on network interface 220, that is, the number of pointers in indirection table 226, and the number of interrupts implemented in MSI-X table, but this is not necessarily so. For example, pointer 0 corresponds to interrupt 0 that serves to direct an interrupt to CPU 0 (242), pointer 1 corresponds to interrupt 1 that serves to direct an interrupt to CPU 1 (244), pointer 2 corresponds to interrupt 2 that serves to direct an interrupt to CPU 2 (246), and pointer 3 corresponds to interrupt 3 that serves to direct an interrupt to CPU 3 (248). When a particular interrupt is selected from MSI-X table 228, such as interrupt 2 in the illustrated example, an interrupt 280 is generated to the selected CPU 246. In another embodiment, when the pointer is selected from indirection table 226, the information 256 that is extracted from data packet 250 is directed 270 by the indirection table pointer to be transferred 274 to the receive buffer 233 of host memory 232. Then, when the interrupt 280 is generated to the selected CPU 246, the selected CPU operates to read information 256 from RS buffer 233 to cache 247.

In one embodiment, the CPUs 242-248 that are associated with the RSS channels are predetermined by a firmware component of network interface 220 when information handling system 200 is powered on. In another embodiment illustrated in FIG. 3, CPU scheduler 234 operates to determine if a particular CPU 242, 244, 246, or 248 is idle or lightly loaded, illustrated here as CPU n (248). Then CPU scheduler 234 directs 304 RSS module 229 to modify the associations between the RSS channels 302 in indirection table 226 and the interrupts 306 in MSI-X table 228 and the CPUs to provide the task of handling network traffic to idle or lightly loaded processors. In this way, when the hash value is in a range that selects, for example hash 2, the information 356 in an associated data packet is directed 308 to cache 249, and the interrupt 210 is directed to CPU 248. In yet another embodiment, RSS module 229 operates in conjunction with CPU scheduler 234 to optimize the loading of network traffic tasks by ensuring that the network processing is performed by a CPU 242, 244, 246, or 248 that is also handling a user process associated with the network traffic. As such, RSS module 229 can provide a prompt to CPU scheduler 234 to move a particular task associated with a network traffic flow to a processor 242, 244, 246, or 248 that is associated with an RSS channel, or the CPU scheduler can modify the associations between the RSS channels and the CPUs to map the network data directly to the user process associated with the network traffic flow. In a particular embodiment, RSS module 229 operates with CPU scheduler 234 to optimize the loading of network traffic tasks in response to changes in the flow rate of network traffic into the network interface.

Figure 3:
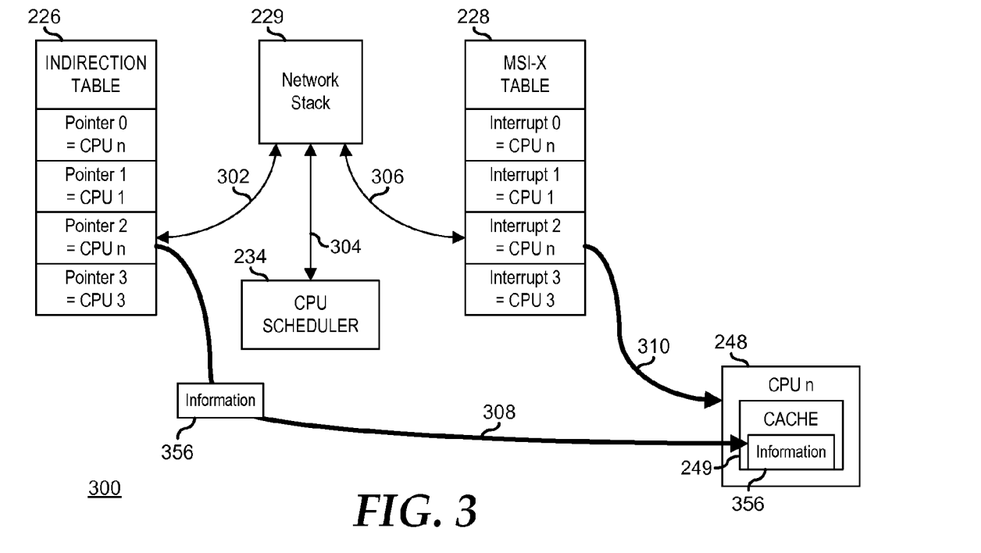
FIG. 3 is a block diagram illustrating a portion of the information handling system of FIG. 2 according to an embodiment of the present disclosure.

In another embodiment, RSS module 229 operates to select a different hash type such that hash type module 222 selects different fields, or tuples, of the data packets on which hash function module 224 operates. In yet another embodiment, RSS module 229 operates to select a different hash function such that hash function module 224 performs a different hash function on the fields provided by hash type module 222, in order to more effectively optimize the processing network traffic flows.

In a particular embodiment, hash type module 222 can operate as a more generalized tuple selector, to select, for example a source or destination IP address field, a TCP port field, or the like. Here further, hash function module 224 can operate to provide a hash value 254 for a particular value of the selected tuple. In this way, a one-to-one mapping between a network flow and a CPU can be established. Here, for example, hash function module 224 can be implemented in whole or in part by a tertiary content addressable memory (TCAM) of an appropriate size.

Figure 4:
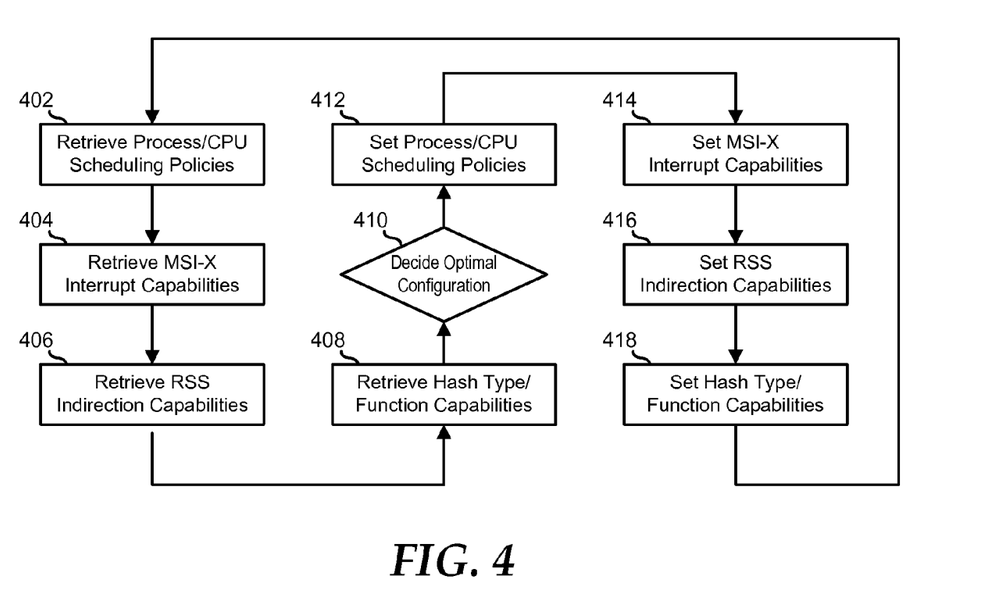
FIG. 4 is a flowchart illustrating a method of handling network traffic in an information handling system through optimization of receive side scaling, according to an embodiment of the present disclosure.

FIG. 4 illustrates method of handling network traffic in an information handling system through optimization of receive side scaling. The method begins in block 402 where scheduling priorities for user processes and CPU utilization are retrieved. For example, RSS module 229 can determine the network traffic needs for a particular user process, and can determine the CPU 242-248 that is being scheduled by CPU scheduler 234 to handle the user process. Further, RSS module 229 can determine that one or more CPU 242-248 is idle, or is currently lightly loaded, and is therefore a candidate for rescheduling to handle the user process and to receive the network traffic flows associated with the user process. The interrupt capabilities for an MSI-X table are retrieved in block 404. For example, RSS module 220 can determine the status of the interrupts in MSI-X table 228. The indirection capabilities for an indirection table are retrieved in block 406. For example, RSS module 220 can determine the status of the pointers in indirection table 226. The hash type and hash function capabilities of the information handling system are retrieved in block 408. For example, RSS module 229 can determine the supported hash types from hash type module 222, and the supported hash functions from hash function module 224. An optimal RSS configuration is determined in block 410. In response to the determination of the optimal RSS configuration, the scheduling priorities for user processes and CPU utilization are set in block 412, the interrupt capabilities for the MSI-X table are set in block 414, the indirection capabilities for the indirection table are set in block 416, the hash type and hash function is set in block 418, and the method returns to block 402 where the scheduling priorities for the user processes and the CPU utilization are retrieved.

In a particular embodiment, in determining the optimal RSS configuration in block 410, a greedy algorithm is implemented which starts with the process and associated networks flows with the highest aggregate frame rate or data rate, and assigns the indirection table entries mapped to by the current hash function for said flows to the CPU or CPUs in use by that process. The algorithm repeats this on the next process with highest aggregate frame rate or data making assignments in the indirection table entries, assuming those entries had not been previously assigned within the algorithm. In another embodiment, in determining the optimal RSS configuration in block 410, a hash selection algorithm is implemented which picks between hash functions (or assignment of hash function parameters) that provide maximize a utility function. The utility function is calculated as the weighted sum of correct number of flows that map in the indirection table to CPUs which currently host a process. The weighting may be based on frame rate or data rate for the given flow. The number of hash functions (or parameter settings) may be excessive so any running of the algorithm may only evaluate a set number of has functions or parameters. In yet another embodiment, in determining the optimal RSS configuration in block 410, both of the above algorithms can be performed concurrently.

Figure 5:
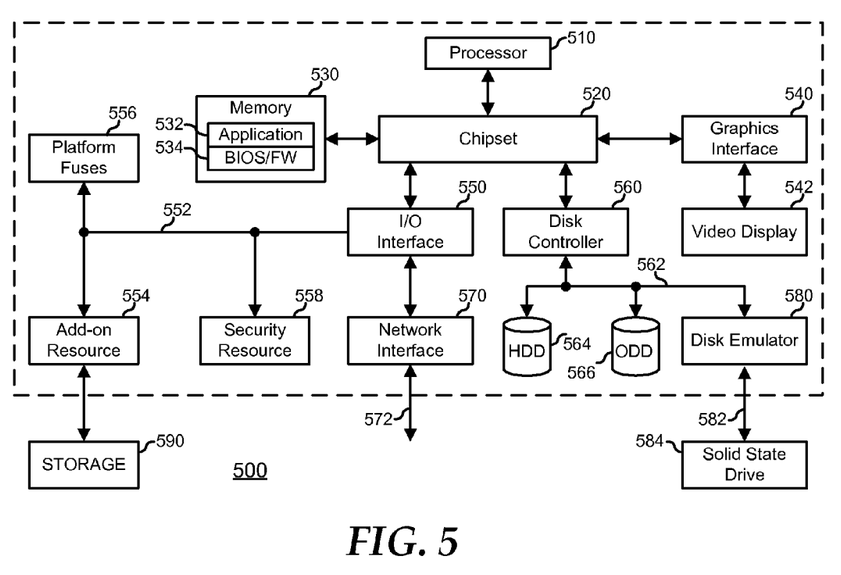
FIG. 5 is a block diagram illustrating an information handling system according to an embodiment of the present disclosure.

FIG. 5 is a block diagram illustrating an embodiment of an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment (not illustrated), information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof. I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platform Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

Figure 6:
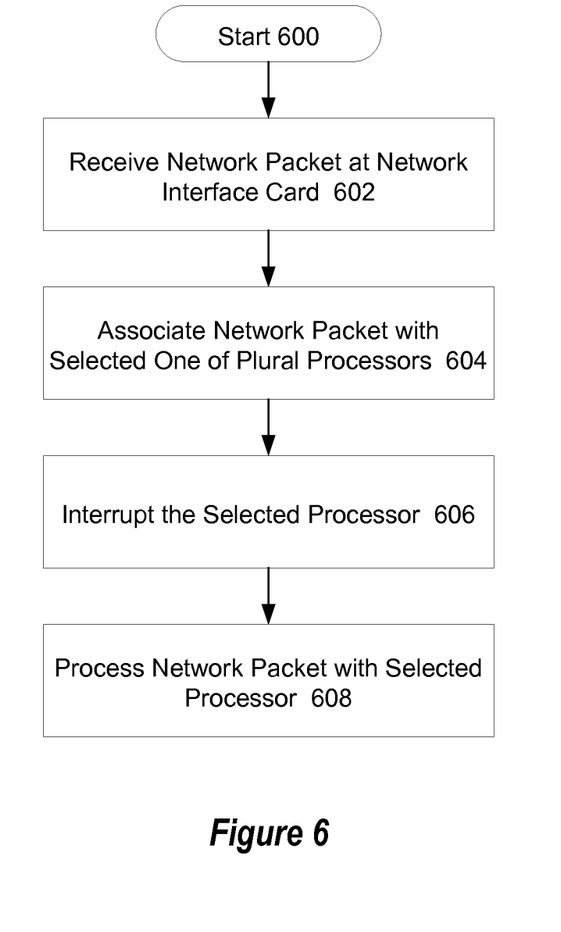
FIG. 6 is a flow diagram of an example of a process for selecting a processor from plural processors to process a network packet.

Referring now to FIG. 6, a flow diagram depicts an example of a process for selecting a processor from plural processors to process a network packet. The process starts at step 600 and continues to step 602 with a network packet received at a network interface card of an information handling system having plural processors, such as plural processing cores disposed in the same or separate substrates as set forth above. The network packet includes header information that indicates destination, address and other information for communicating the network packet and a payload that is used by a process to perform a function, such as displaying information. At step 604, the network packet is associated with a process running on a selected one of the plural processors, such as by performing a hash of predetermined portions of the network packet and comparing the network packet hash value with expected hash values of network packets directed to processes running on the processors. In an example embodiment described above, the network packet hash value is applied to an indirection table to associate the network packet with a processor running a process having the hash value. For instance, the hash uses header information to associate the payload with a process running on a processor of an information handling system. At step 606, an interrupt issues to the selected processor that runs the process associated with the network packet so that at step 608 the selected processor processes the packet.

The process depicted by FIG. 6 and above directs network packets to processors based upon the processes running on the processors. In one embodiment, the process is a virtual machine executing on one or more processors to run applications that perform network-supported functions. Virtual machines enhance information handling system resource utilization by defining virtual information handling systems that run over physical information handling system resources. A hypervisor or other operating system runs over the physical components to support execution of separate virtual information handling systems that each support independently-managed functions. For example, a virtual machine supports a virtual private network (VPN) application that runs over a Linux operating system on a virtual processor under the control of a hypervisor to support client network interactions through a VPN. The VPN application and Linux operating systems interact with a virtual processor and virtual network interface card to support VPN communications as if the virtual processor and virtual network interface card are actual physical components, and the hypervisor schedules physical components to perform operations for the VPN application based upon the availability of physical processor and network interface card resources.

Figure 7:
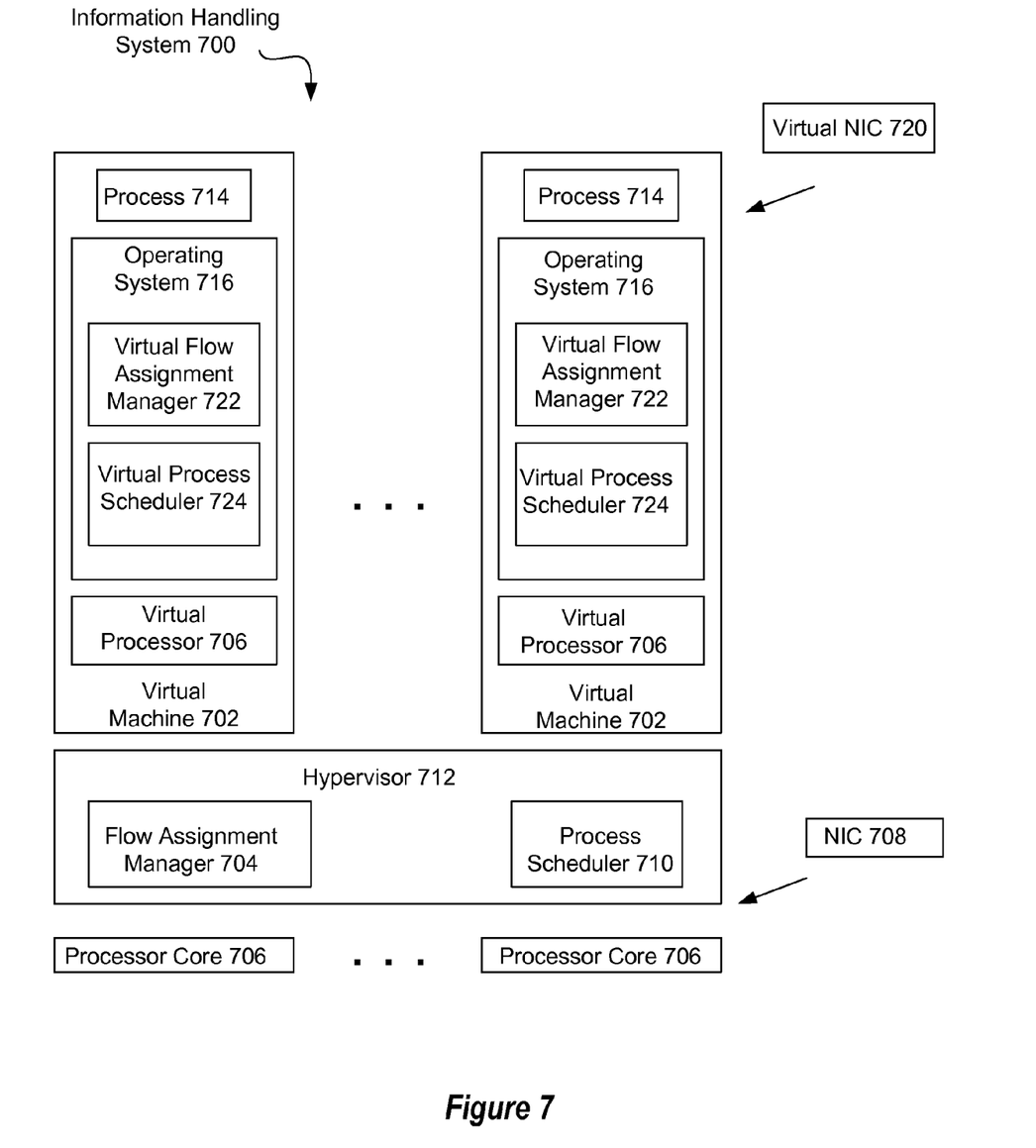
FIG. 7 is a block diagram of an example embodiment of an information handling system having plural virtual machines and a network flow assignment manager to direct network packets to physical processing resources of the virtual machine associated with the network packets.

Referring now to FIG. 7, a block diagram depicts an example embodiment of an information handling system 700 having plural virtual machines 702 and a network flow assignment manager 704 to direct network packets to physical processing resources of the virtual machine 702 associated with the network packets. Network flow assignment manager 704 maps associations between the information of the network packet and the one or more processes executing on one or more of the plural processors by reference to assignments by a process scheduler 710 of the one or more processes to the plural processors. Information handling system 700 includes physical processing resources that interface with each other to process information, such as plural processors 706 interfaced with a network interface card (NIC) 708 through a system bus, such as a PCIe link. In the example embodiment, each processor 706 is a processor core on a common substrate that processes information; however, in alternative embodiments processors 706 can be processor cores on separate or common substrates such as discussed above. Process scheduler 710 executes over one or more processors 706 to manage scheduling of processes for execution on physical resources. For example, process scheduler 710 is logic in a hypervisor 712 or other operating system that assigns virtual machines 702 to physical resources for execution. In one example embodiment, process scheduler 710 provides flow assignment manager 704 with information about the physical processor core 706 that a process is assigned to execute upon so that flow assignment manager 704 can direct network packets for use by a process to the processor core 706 that is executing the process. For instance, flow assignment manager 704 includes a hash function, indirection table and MSI-X table as depicted by FIG. 2 to perform a hash on a network packet, associate the network packet with a processor 706 running a process associated with the network packet, and interrupt the associated processor 706 to retrieve the network packet for use by the process. In alternative embodiments, flow assignment manager 704 can apply other techniques to direct a network packet to a processor that is running a process that is associated with the network packet.

As set forth above with respect to FIGS. 1-5, flow assignment manager 704 operates with hypervisor 712 process scheduler 710 and with NIC 708 to assign flows of network packets to a selected of the processor cores 706 for data queuing and interrupt routing. Using the VPN example described above with respect to FIG. 6, a client information handling system interfaces through NIC 708 with a VPN application running as process 714 of a virtual machine 702 to access network resources. Process 714 runs over a guest operating system 716 and virtual processor 718 of a virtual machine 702. Process scheduler 710 of hypervisor 712 schedules virtual machine 702 to execute as a process on physical resources, such as a processor 706. When a network packet associated with the VPN application arrives at NIC 708, flow assignment manager 704 directs the physical processor 706 associated with the VPN application process 714 to issue an interrupt and process the network packet. Process scheduler 710 maps the physical processor 706 that runs the virtual processor 716 so that the appropriate physical processor 706 receives the network packet from the physical NIC 708. Network packet information used in a hash to associate the network packet with a process 714 and processor 706 can include addresses in the packet header, such as a virtual local area network identifier (VLAN ID) or other information. In one embodiment, flow assignment manager 704 obtains mapping information from process scheduler 710 as needed to respond to network flows, such as when a process 714 is of a particular type, like a VPN, or exceeds a threshold level of communication, such as a packet or data quantity within a time period. In an alternative embodiment, flow assignment manager 704 obtains mapping information from process scheduler 710 upon predetermined events, such as the establishment of a VPN connection or movement of a process 714 to a predetermined processor 706 that directly interacts with NIC 708 due to the anticipated level of network communication associated with the process.

Although flow assignment manager 704 manages flow assignments of network packets to physical processing resources, guest operating systems 716 of virtual machines 702 need to interact with network packets to support processes 714 running on virtual machines 702. One option for interacting network packets and processes 714 is to run RSS in guest operating systems 716 so that a virtual NIC 720 forwards the network packets to virtual processors 718; however, running conventional RSS in this manner will result in spreading received network packets across all virtual processors 718 evenly, which can cause packet data to be copied across physical processors 706 unnecessarily. In order to more efficiently process network packets in the virtual machine environment, a virtual flow assignment manager 722 coordinates network packet processing by reference to a process scheduler 724, which assigns processes to virtual processors in the virtual machine environment. By associating a network packet to a process 714 running on a virtual processor 718, virtual flow assignment manager 722 is able to coordinate an interrupt by the virtual processor 718 to the virtual NIC 720 that will have the network packet retrieved to the virtual processor 718 running the process associated with the network packet.

In one embodiment, hypervisor 712 places newly received network packets into a buffer of virtual NIC 720 and marks each packet with an identifier number of the virtual machine 702 virtual processor 718 on which processing of the network packet should take place. Hypervisor 712 knows the virtual processor number 718 and the physical processor 706 on which the processing will occur because process scheduler 710 schedules physical resources for use by virtual machines 702. The virtual processor 718 identifier number corresponds to the physical processor 706 where the network packet was received and processed by flow assignment manager 704 upon receipt at NIC 708. The virtual NIC 720 then applies the virtual processor identifier associated with the network packet to issue an interrupt to that virtual processor 718 to process the network packet. In the event that multiple virtual processors 718 are scheduled to the same physical processor 706, the virtual machine operating system 716 is free to schedule packet processing on any of the indicated virtual processors 718. Processing efficiency is enhanced through this embodiment in that hypervisor 712 knows the most appropriate virtual processor 718 on which to handle a network packet because hypervisor 712 schedules the virtual processor 718 to execute on the physical processor 706 where the network packet was received from NIC 708. A difficulty of this embodiment is that hypervisor 712 includes logic to provide virtual processor to physical processor mapping to guest operating systems 718 and the driver for virtual NIC 720 includes logic to read the mapping.

In an alternative embodiment, network packets are assigned to virtual processors 718 by providing mirrored functionality for virtual flow assignment manager 722 to the functionality provided by flow assignment manager 704. For example, virtual flow assignment manager 722 responds to network packets placed in virtual NIC 720 in a similar manner to that of flow assignment manager 704 in response to network packets placed in NIC 708. Virtual process scheduler 724 provides virtual flow assignment manager 722 with process assignments to virtual processors 718 so that virtual flow assignment manager 722 performs a hash of network packets sent into virtual NIC 720 to determine the virtual processor 718 that should receive the network packets, such as is set forth in greater detail in FIGS. 1-5 above. Virtual flow assignment manager 722 and process scheduler 724 cooperate to manage network flows so that each network flow of related network packets stays assigned to a single virtual processor 718. Flow assignment manager 704 works independently on the physical resource layer to keep each network flow on the same physical processor 706. Assignments on virtual and physical resources are made in this manner without adding communication between guest operating systems 716 and hypervisor 712, such as to provide physical processor to virtual processor mapping for use in the virtual resources.

Figure 8:
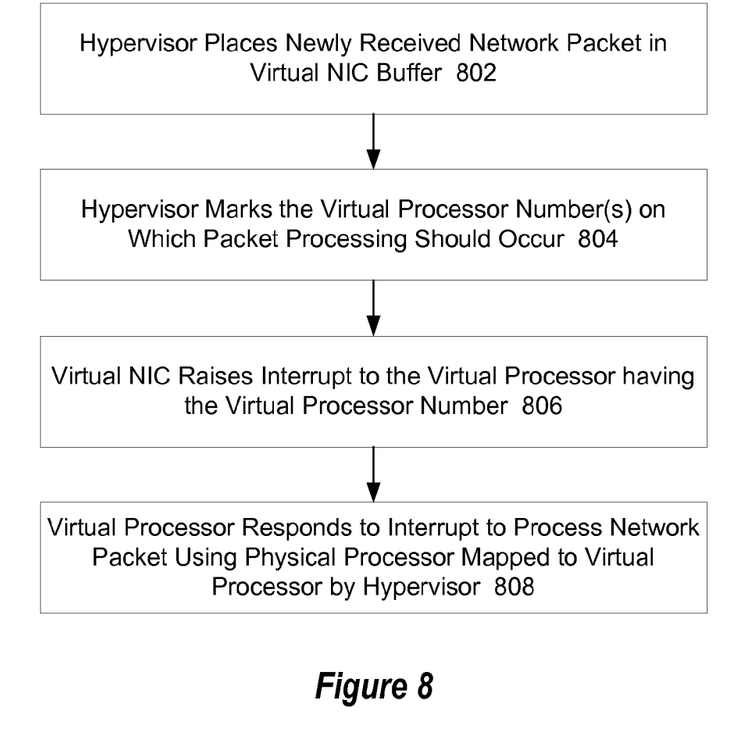
FIG. 8 is a flow diagram of a process for managing virtual processors to process network packets received at a virtual network interface card.

Referring now to FIG. 8, a flow diagram depicts a process for managing virtual processors to process network packets received at a virtual network interface card. The process starts at step 802 with a hypervisor placing a newly received network packet in a virtual NIC buffer for processing by a process running on a virtual machine supported by the hypervisor. At step 804, the hypervisor marks the virtual processor number or numbers at the network packet in the virtual NIC buffer to indicate the virtual processor or virtual processors on which processing of the network packet should occur. At step 806, the virtual NIC raises an interrupt to the virtual processor having the virtual processor number marked by the hypervisor. At step 808, the virtual processor responds to the interrupt to process the network packet from the virtual NIC buffer. The virtual processor maps to a physical processor that the hypervisor has assigned to execute the process associated with the network packet. The hypervisor provides enhanced efficiency by marking the network packet at the virtual NIC buffer with a virtual processor identifier that the hypervisor has already mapped to be executed on the physical processor that has retrieved the network packet at the physical resource layer.

Figure 9:
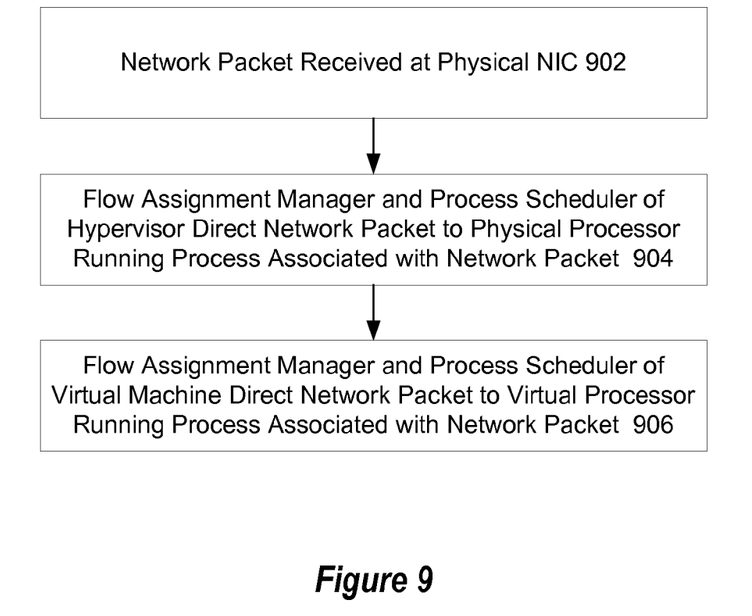
FIG. 9 is a flow diagram of a process for managing virtual processors to process network packets received at a virtual network interface card.

Referring now to FIG. 9, a flow diagram depicts a process for managing virtual processors to process network packets received at a virtual network interface card. The process starts at step 902 with a network packet received at a physical network interface card. At step 904, a flow assignment manager and process scheduler of a hypervisor operates at a physical resource layer to manage physical resources, such as the physical processor and NIC that receive and process network packets. For example, at step 904 a network packet newly received at a physical NIC is managed as set forth above in the description of FIGS. 1-5 so that a physical processor executing a process associated with the network packet has an interrupt to retrieve and process the network packet. At step 906, the process step of 904 is essentially mirrored in the virtual resource layer with virtual resources, such as a virtual processor and virtual NIC. For example, a flow assignment manager and process scheduler of a virtual machine operating system direct a network packet newly received in a virtual NIC to a virtual processor as if in a physical resource environment using the techniques set forth above with respect to FIGS. 1-5. The flow assignment manager coordinates an interrupt to a virtual processor to read the network packet from the virtual NIC so that the network packet is processed by the virtual processor supporting a process that uses the information of the network packet. In alternative embodiments, the hypervisor manages processing of network packets in alternative ways. In one embodiment, initial processing of the network packet occurs at a physical layer by issuing an interrupt to retrieve the network packet from the NIC to the processor executing or scheduled to execute a virtual machine associated with the network packet and then placing the network packet in a virtual NIC buffer for use by the virtual machine. In an alternative embodiment, the network packet is stored in a virtual NIC buffer until an interrupt issued for a virtual processor of a virtual machine associated with the network packet results in an interrupt at the physical processor to retrieve the network packet from the virtual NIC buffer to the physical processor for processing by the virtual machine.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
plural processors, each processor operable to execute one or more processes;
memory interfaced with the processors and operable to store information in support of execution of the one or more processes;
a process scheduler interfaced with the plural processors and operable to assign the processes to the processors for execution;
one or more network interface cards interfaced with the processors, the network interface cards operable to receive network packets having information from a network and to communicate the information of the network packets to a selected of the plural processors;
a network flow assignment manager interfaced with the process scheduler and the one or more network interface cards, the network flow assignment manager operable to direct the one or more network interface cards to communicate the information of one or more network packets to one of the plural processors based upon an association between the information and the one or more processes executing on the one of the plural processors;
a hypervisor executing on one or more of the processors, the hypervisor operable to support execution of plural virtual machines on the plural processors over plural virtual processors; and
a virtual network interface card executing over the hypervisor and operable to receive a network packet from the hypervisor, the hypervisor including a virtual processor identifier with the network packet, the virtual processor identifier associated with a physical processor identifier, the virtual network interface card further operable to apply the virtual processor identifier to raise an interrupt with the virtual processor to process the network packet.

2. The information handling system of claim 1 wherein the network flow assignment manager maps associations between the information and the one or more processes executing on the plural processors by reference to assignments by the process scheduler of the one or more processes to the plural processors.

3. The information handling system of claim 1 wherein the network flow assignment manger maps associations between the information and the one or more processes executing on the plural processors by directing the process scheduler to assign one or more of the processes to the one predetermined of the plural processors.

4. The information handling system of claim 1 wherein the one or more processes comprise a virtual machine.

5. The information handling system of claim 1 wherein the one or more processes comprise an application executing over a virtual machine.

6. An information handling system comprising:
plural processors, each processor operable to execute one or more processes;
memory interfaced with the processors and operable to store information in support of execution of the one or more processes;
a process scheduler interfaced with the plural processors and operable to assign the processes to the processors for execution;
one or more network interface cards interfaced with the processors, the network interface cards operable to receive network packets having information from a network and to communicate the information of the network packets to a selected of the plural processors;
a network flow assignment manager interfaced with the process scheduler and the one or more network interface cards, the network flow assignment manager operable to direct the one or more network interface cards to communicate the information of one or more network packets to one of the plural processors based upon an association between the information and the one or more processes executing on the one of the plural processors;
a hypervisor executing on one or more of the processors, the hypervisor operable to support execution of plural virtual machines on the plural processors;
plural virtual machines executing over the hypervisor, the hypervisor defining plural virtual processors and at least one virtual network interface card;
a virtual process scheduler executing over the hypervisor and operable to assign virtual machine processes to the virtual processors for execution; and
a virtual network flow assignment manager executing over the hypervisor, the virtual network flow assignment manager operable to direct the at least one virtual network interface card to communicate the information of one or more network packets to a predetermined one of the plural virtual processors based upon an association between the information and the one or more virtual machine processes.

7. A method for processing a network packet received at an information handling system having plural processors, the method comprising:
receiving the network packet at a network interface card of the information handling system;
mapping a process to a one of the plural processors executing the process;
generating a hash from predetermined information of the network packet;

comparing the generated hash with a predetermined hash value associated with the process;

applying the mapping to identify the one of the plural processors to receive the network packet; and raising an interrupt to the one of the plural processors to process the network packet with the one of the plural processors.

8. The method of claim 7 wherein the predetermined process information comprises a virtual local area network identifier (VLAN ID).

9. A method for processing a network packet received at an information handling system having plural processors, the method comprising:

receiving the network packet at a network interface card of the information handling system;

analyzing the network packet to associate the network packet with one of the plural processors; and in response to analyzing, raising an interrupt to the one of the plural processors to process the network packet with the one of the plural processors;

wherein analyzing the network packet to associate the network packet with one of the plural processors further comprises:

determining that a process has a network flow of at least a predetermined amount;

in response to determining, moving the process to the one of the plural processors;

associating a hash of information of the process with the one of the plural processors; and determining that a hash of the network packet is the hash of the information of the process.

10. The method of claim 9 wherein analyzing the network packet to associate the network packet with one of the plural processors further comprises:

executing a hypervisor on another of the processors, the hypervisor supporting execution of plural virtual machines on the plural processors, each virtual machine associated with a virtual processor;

analyzing the network packet to associate the network packet with one of the virtual processors; and associating the one of the virtual processors with the one of the plural processors.

11. The method of claim 9 wherein analyzing the network packet to associate the network packet with one of the virtual processors further comprises:

mapping a virtual machine process to the one of virtual processors executing the virtual machine process;

comparing network packet information to predetermined virtual machine process information to associate the network packet with the virtual machine process; and applying the mapping to identify the one of the virtual processors to receive the network packet.

12. A method for processing a network packet received at an information handling system having plural processors, the method comprising:

receiving the network packet at a network interface card of the information handling system;

analyzing the network packet to associate the network packet with one of the plural processors; and in response to analyzing, raising an interrupt to the one of the plural processors to process the network packet with the one of the plural processors;

wherein analyzing the network packet to associate the network packet with one of the plural processors further comprises:

executing a hypervisor on another of the processors, the hypervisor having a virtual network interface card and supporting execution of plural virtual machines on the plural processors;

marking the network packet by the hypervisor with a virtual processor identifier that identifies a virtual processor associated with processing of the network packet;

placing the network packet by the hypervisor in a buffer of the virtual network interface card;

raising an interrupt by the virtual network interface card to the virtual processor associated with the virtual processor identifier; and mapping the virtual processor to the one of the plural processors to process the network packet with the one of the plural processors.

13. A method for selecting a processor from plural processors to process a network packet, the method comprising:

receiving the network packet at a network interface card;

performing a hash of predetermined information of the network packet;

associating the hash with one of plural process hashes, each process hash associated with a process running on one or more of the processors;

determining a processor of the plural processors associated with the associated one of plural process hashes; and issuing an interrupt to the determined processor to process the network packet.

14. The method of claim 13 wherein the network interface card is a virtual network interface card, each process is associated with a virtual machine running on a virtual processor, determining a processor further comprises mapping the virtual machine virtual processors to physical processors and issuing an interrupt further comprises issuing an interrupt to the physical processor that maps to the virtual processor associated with the process.

15. A method for selecting a physical processor from plural physical processors to process a network packet, the plural physical processors supporting plural virtual processors, the method comprising:

receiving a network packet in a virtual network interface card;

associating the network packet with a process;

associating the process with a virtual processor;

issuing an interrupt from the virtual network interface card to the virtual processor associated with the network packet process;

receiving the interrupt at a hypervisor supporting the virtual network interface card; and issuing an interrupt by the hypervisor to the physical processor supporting the virtual processor.

16. The method of claim 15 wherein:

associating the process with a virtual processor further comprises mapping processes to virtual processors and physical processors with a hypervisor; and issuing an interrupt to the virtual processor further comprises providing the mapping to the virtual network interface card.

* * * * *